United States Patent [19]

Striker

[11] 3,959,676
[45] May 25, 1976

[54] ALTERNATOR RECTIFIER BRIDGE AND METHOD OF ASSEMBLY

[75] Inventor: David L. Striker, Plymouth, Mich.

[73] Assignee: Ford Motor Company, Dearborn, Mich.

[22] Filed: Dec. 23, 1974

[21] Appl. No.: 535,932

[52] U.S. Cl. .............................. 310/68 D; 29/577; 29/629; 321/8 R; 357/76
[51] Int. Cl.² ......................................... H02K 11/00
[58] Field of Search ..................... 29/576, 577, 626; 310/68 D; 321/8; 357/76

[56] References Cited
UNITED STATES PATENTS

| | | | |
|---|---|---|---|
| 3,641,374 | 2/1972 | Sato | 310/68 D |
| 3,739,209 | 6/1973 | Drabik | 310/68 D X |
| 3,777,193 | 12/1973 | Buehner | 310/68 D |
| 3,812,390 | 5/1974 | Richards | 310/68 D |
| 3,870,944 | 3/1975 | Ogawa et al. | 321/8 R |

*Primary Examiner*—William M. Shoop
*Attorney, Agent, or Firm*—Robert A. Benziger; Keith L. Zerschling

[57] ABSTRACT

An alternator rectifier assembly for rectifying the output of a poly-phase AC alternator and its method of assembly are disclosed. The alternator assembly comprises a pair of heat sinking DC terminal plate members having a plurality of diode containing recesses with a generally U-shaped circuit board member. The circuit board member is riveted to each of the heat sinking terminal plate members to form a unitary composite body.

The generally U-shaped circuit board member is comprised of a plurality of mutually insulated conductive strips embedded within a plastic material. The ends of the conductors within the circuit board member are exposed for contact with terminals of the diode elements. A plurality of alternator terminal members may be situated within suitably formed recesses or voids within the circuit board member so as to be in contact with the conductive strips and all electrical connections may be soldered by a single pass through a soldering oven. Additional bonding support between the circuit board member and each of the DC terminal plate members is obtained by use of mounting bolts which extend through the unitary composite body. The mounting bolts are provided with knurled shoulders which cooperate with the heads of the bolts to assist the rivets in maintaining the structure in assembled relation.

12 Claims, 1 Drawing Figure

U.S. Patent May 25, 1976 3,959,676
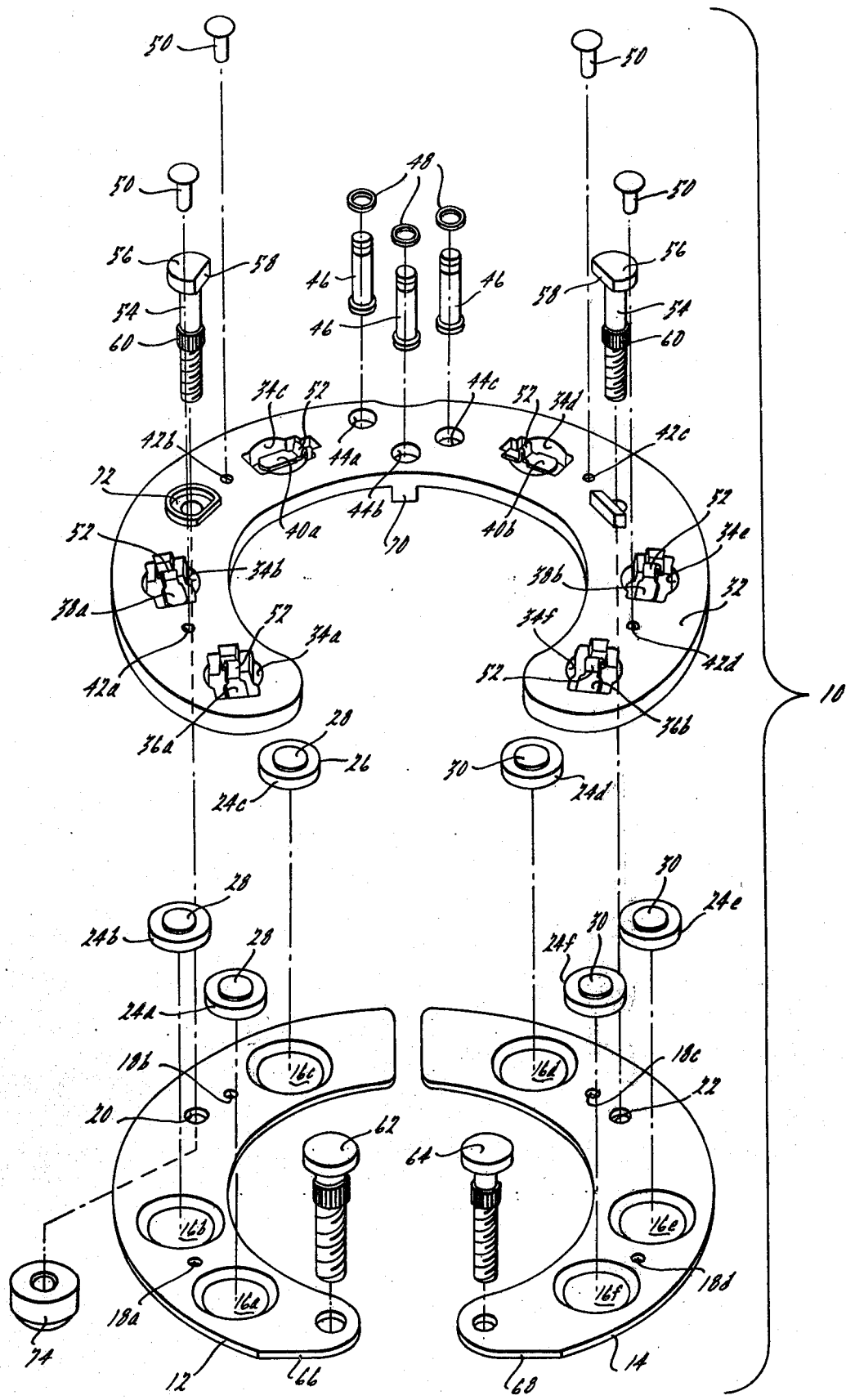

3,959,676

ALTERNATOR RECTIFIER BRIDGE AND METHOD OF ASSEMBLY

BACKGROUND OF THE INVENTION

1. Field of the Invention

The present invention is directed to the field of alternator rectifier bridge assemblies and more particular to that portion of the above-noted field which is concerned with the manufacture of rectifier structures which structures may be conveniently received with an alternator housing and which structures are useful in converting poly-phase AC alternator output to a DC potential for application to a vehicle electrical system which may include, for example, a storage battery. More particularly still, the present invention is concerned with that portion of the above-noted field which is directed to the manufacture of alternator rectifier bridge assemblies in which the DC terminals also act as heat sinking means to maintain operating temperatures below those temperatures at which semi-conductor rectifier elements are destroyed. More particularly still, the present invention is concerned with the method by which alternator rectifier bridge assemblies may be conveniently fabricated on automated equipment, making use of a commercially available rugged forms of semi-conductor diode elements, and which require only a single exposure to an elevated temperature to solder all electrical connections.

2. Description of the Prior Art

The prior art teaches that a poly-phase AC alternator output may be rectified to a DC potential by connecting pairs of diodes in electrical series relationship with the common anode/cathode electrode of each diode pair connected to receive one phase of the poly-phase output of the alternator. The other anode and the other cathode of each diode pair will comprise at least a portion of each of the DC terminals. Three such pairs of diodes, each having their common anode/cathode electrode connected to one phase of a three phase alternator output, may be connected in parallel to provide full wave rectification for the three phase alternator and will provide the DC potential between their common anodes and their common cathodes.

The applicant's pending application Ser. No. 379,136, "Semi-Conductor Rectifier Heat Sink Assembly" described a rectifier assembly and illustrates one form by which such devices may be assembled. As there illustrated, canister type semi-conductor diode devices are received within heat sink structure. Each diode device has an extending electrical lead, which may comprise either the anode or the cathode electrode, which lead is communicated to a circuit board member where it is soldered to a portion of the electrical circuit therein provided. As illustrated in the noted application, the rectifier bridge assembly is generally U-shaped and may be conveniently mounted within one end of the alternator structure with the axis of the alternator rotor extending through the U. This provides a relatively simple packaging arrangement for those who desire to use such structures. However, the use of canister type diodes results in certain handling problems stemming from the frailness of such devices. The insertion of the extending electrode wires through the circuit board member frequently requires a hand operation to align the projecting leads with holes provided therefor in the circuit board. It is therefore an object of the present invention to provide an alternator rectifier assembly which is generally U-shaped in configuration and which is mechanically sturdy and rugged. Since the frailness of the prior art devices resulted in part from the configuration of the diode devices, i.e., diode devices having extending electrode leads, it is a further object of the present invention to provide an alternator rectifier assembly which utilizes diode devices which are free of any extending electrode leads. It is a further object of the present invention to provide such a device wherein the circuit board member and the DC terminal plate members (heat sinks) are in mutually supporting contact.

U.S. Pat. No. 3,648,121 issued to M. Suenaga et al. describes a structure which generally achieve the aforementioned objectives. Therein a generally U-shaped alternator rectifier bridge assembly having integral heat sink structure is shown to be fabricated into a composite body with the circuit board member in physical contact with the DC terminal plate members (heat sinks) over an extended surface area. This provides for an increased strength in the device without any substantial loss in the heat sinking capability of the heat sink member. This structure also avoids the necessity for accurate positioning of the holes of a circuit board member in registry with the extending electrode leads of the canister type diode devices.

The Suenaga et al. reference teaches the use of the heat sink members as the base layer with successive layers of material, termed therein "prepreg", overlaying the base layer. The prepreg material is, for example, an epoxy resin impregnated fibrous material such as fiberglass fabric and includes a plurality of voids or recesses. A plurality of semi-conductor rectifier wafers are positioned within the voids and an overlaying layer of conductor strips is arranged to interconnect selected diode pairs. Solder material is also provided in preforms where necessary. This composite is thereafter passed through several heating ovens in order to flow the solder to establish the electrical connections and to cause the resinous material in the prepreg to flow and bond the structure into a unitary composite. This material will also flow into the diode recesses to support and insulate the diode wafers. While the resulting rectifier bridge assembly is of great utility and possesses the desired ruggedness in handling, the requirement that the materials withstand several passages through heating ovens operating at different temperatures results in a greatly increased risk of semi-conductor failure because of the temperature involved. Additionally some failures have resulted from an uneven flow of the resinous material which produced bubbles and weak spots within the composite assembly. It has also been observed that the resulting rectifier bridges are relatively delicate in that the cured epoxy or resinous material and the layered materials enclosed therein are subject to fracturing if mishandled prior to assembly within an alternator. This fracturing results from the extreme hardness and brittleness of the epoxy and may occur when a rectifier assembly is dropped or when adjacent rectifier assemblies forcibly contact each other during packaging, shipping or other incidental handling. These fractures greatly weaken the mechanical strength of the rectifier assembly and also constitute a source of potential electrical failure since the conductors may be exposed to contamination. It is therefore an object of the present invention to provide an alternator rectifier assembly which is rugged and which has a relatively resilient circuit enclosure.

It is therefore a further and specific object of the present invention to provide an alternator rectifier bridge assembly which does not require the application of heat at differing temperatures in order to accomplish bonding. It is a further object of the present invention to provide a rugged alternator rectifier bridge assembly wherein the circuit board member and the DC terminal plate members are in close physical contact and which utilizes diode elements which are adequately insulated without requiring that resinous material flow about the semi-conductive rectifier wafer. It is also an object of the present invention to provide a method of assembly of an alternator rectifier which method will result in a unitary composite rectifier/heat sink structure which method does not require the application of heat or thermal energy other than that necessary to flow the solder material to provide electrical connections. It is also an object of the present invention to provide such a rectifier bridge assembly having a generally U-shaped configuration which may be conveniently assembled to an alternator structure by mounting within the housing thereof. It is also an object of the present invention to provide a method of assemblying an alternator rectifier in which the DC terminal heat sink members may be fixedly attached to, and in close physical contact with, a circuit board member formed of a plastic material having the circuit elements embedded therein. More particularly still, it is a specific object of the present invention to provide a method of assembly for an alternator rectifier assembly comprised of heat sink members and circuit board member which are held in assembled relationship by the means of rivets.

SUMMARY OF THE PRESENT INVENTION

The present invention provides an alternator rectifier bridge and its method of assembly wherein the rectifier bridge comprises a pair of heat sinking DC terminal plate members held in assembled relationship to a plastic circuit board member by a plurality of rivet elements and having a plurality of semi-conductor diode elements compressively confined between the plate members and the circuit board. The circuit board member is provided with a plurality of flat strip conductors having their ends exposed and configured for cooperation with a plurality of recesses formed in the DC terminal plate members to receive and compressively engage the semi-conductor diode elements. The circuit board member and the heat sinking terminal plate members are apertured for receipt of mounting bolts having a head and a threaded shaft portion with a knurled shoulder means intermediate the head and the free end of the threaded shaft portion so that the lead and the knurled shoulder means of the mounting bolts may additionally assist in maintaining the circuit board member and the terminal plate members in assembled relationship. The circuit board member is further provided with a plurality of apertures extending from one side thereof to the conductive strip members intermediate the ends thereof and electrical alternator terminal members are mounted therein.

The rectifier bridge assembly of the present invention may be fabricated through the use of automated equipment by separately fabricating each of the individual elements thereof and thereafter progressively assembling these elements through the use of a suitable assembly fixture. The heat sinking DC terminal plate members may be set within the fixture and the semi-conductor diode elements may be deposited within the recesses in the proper electrical polarity. The circuit board member may thereafter be placed over the terminal plate members so that the exposed free ends of each of the conductive strips provided therein may be situated in contact with the exposed terminals of the semi-conductor diode elements. The circuit board member may then be riveted to the heat sinking DC terminal plate members and terminals for electrical communication with the phases of the alternator may be situated within voids provided therefor in the circuit board member so as to be in physical contact with the conductive strip members intermediate the ends thereof. Preformed solder rings may be placed over the alternator connecting terminals. The composite structure so formed may then be passed through a soldering furnace so that electrically conductive solder joints are formed between the various electrical elements of the rectifier bridge circuit. Additionally, a pair of mounting bolts having a head portion and a knurled portion spaced apart therefrom may be inserted within suitably provided holes therefor within the composite assembly so that the knurled portion and the head portion of the mounting bolts cooperate to maintain the heat sinking terminal plate members in intimate contact with the circuit board member to assist the rivet means.

BRIEF DESCRIPTION OF THE DRAWING

The single drawing is an exploded view of the alternator rectifier assembly according to the present invention which is illustrative of its method of manufacture.

DETAILED DESCRIPTION OF THE PREFERRED EMBODIMENT

Referring now to the drawing, an alternator rectifier assembly 10 according to the present invention is illustrated in an exploded view. Each member of a pair of heat sinking DC terminal plate member 12, 14 is provided with a plurality of diode receiving cavity or depressions 16a, 16b, 16c, 16d, 16e, 16f. The terminal plate members 12, 14 are also provided with a first plurality of apertures 18a, 18b, 18c, 18d. Terminal plate member 12 is provided with a further aperture 20 while terminal plate member 14 is provided with a corresponding aperture 22.

A diode element 24 is positioned in each of the diode receiving cavities 16. In the illustrated embodiment, diode elements or members 24 are the so-called "button" type diodes such as for example part number SR-2531 available from Motorola, Inc. Each diode member 24 is comprised of a wafer of semi-conductor rectifier material situated within a housing member 26 and electrically connected to a pair of disc-like electrode members 28, 30. The electrode members 28, 30 are situated on opposite planar faces of the housing member 26 with terminal member 28 representing the cathode electrode of the diode and terminal member 30 representing the anode electrode of the diode. The diode members 24a, 24b, 24c are received within the diode receiving cavities 16 of terminal plate member 12 having the corresponding letter suffix designation and are arranged to place their anode electrode in direct contact with the bottom of the diode receiving cavity 16. The diode members 24d, 24e, and 24f are situated within the correspondingly designated diode receiving cavities 16 of terminal plate member 14 and are arranged to place their cathode electrode in direct contact with the bottom of the diode receiving cavity 16. It is to be understood that the specification of a particularly polarity is arbitrary and for purposes of description. In practice, the opposite polarity could also be adopted. Each of the electrodes 28, 30 of the diode members 24 may be provided with a tinned surface of suitable solder material prior to assembly of the alternator rectifier. The purpose of this will be explained hereinbelow.

Circuit board member 32 is disposed in overlaying relation to the heat sinking DC terminal plate members 12, 14. Circuit board member 32 is a generally U-shaped plastic member having embedded therein a plurality, in this case three, of flat conductive strip members.

Circuit board member 32 is formed so as to have a first plurality of aperture 34 which are situated and arranged to expose the ends of each of the conductive strip members which are embedded within the circuit board member. Thus, exposed conductive strip member ends 36a, 36b are opposite ends of the same conductive strip and are in electrical communication with each other while ends 38a and 38b are similarly in electrical communication with each other as are ends 40a and 40b. Circuit board member 32 is also provided with means defining a plurality of second apertures 42a, 42b, 42c, 42d which are arranged to be in registry with the rivet apertures 18 of the terminal plate members 12, 14. Second apertures 42 are arranged so as to pass through circuit board member 32 without exposing any portion of any of the flat conductive strip members. Circuit board member 32 is provided with means defining a further plurality of apertures of voids 44 which extend through the upper surface (relative to the figure) of circuit board member 32. These apertures or voids 44 expose central portions of each of the conductive strip members. A plurality of terminal members 46 are situated within the apertures 44 and are arranged to project upwardly therefrom. An annulus or ring of preformed solder material 48 is placed over the upwardly projecting portion of terminal members 46 and is allowed to drop under the influence of gravity into a position in close proximity to the exposed portion of the flat conductive strip members within apertures 44.

A plurality of rivet members 50 are inserted within the second apertures 42 of the circuit board member 32 so as to project through the rivet apertures 18 of each of the plate members 12, 14. At least two rivet members 50 will project through the circuit board member 32 and each of the terminal plate members 12, 14. By a suitable crimping action, the rivet members 50 may be properly deformed so as to hold circuit board member 32 and the terminal plate members 12, 14 in assembled relation with the terminal plate members 12, 14 in close physical contact with the circuit board member 32. The plurality of diodes 24 situated within diode cavities 16 will be compressively retained therein by the resilient action of the U-shaped bends 52 provided at the exposed conductive strip member ends 36, 38, 40. The compressive action will assure that contact between each of the electrodes 28, 30 and one of either of the terminal plate members 12, 14 or the conductor strip members ends 36, 38, 40 occurs. Due to the relatively large surface areas of the electrodes 28, 30 and the relatively large surface area of the conductor strip member ends 36, 38, 40, the placement and size of the diode receiving cavities 16 may be made acceptable within a wide tolerance range.

Circuit board member 32 may be fabricated by forming arcuately shaped conductors and positioning the conductors in spaced-apart, noncontacting, relation with the ends of the conductors equidistantly spaced from a central point. The ends of the conductors are configured to have a generally U-shaped resilient bend, as shown at 52, whose importance will be discussed hereinbelow. The conductors are so arranged within a mold and suitable plastic material is injected to completely surround the conductors. The mold is adapted and arranged to prevent the plastic material from engulfing the configured ends of the conductors and to provide the various passages and shapes discussed throughout this specification. Typically, a thermosetting plastic would be used but a thermoplastic material having a softening temperature above the soldering temperature of the selected solder material could also be used.

A first pair of mounting bolts 54 is inserted within apertures provided therefor in the circuit board member 32 so as to extend through the circuit board member 32 and through mounting bolt apertures 20, 22 in the terminal plate members 12, 14. The mounting bolts 54 are provided with a head portion 56 having a flattened side portion 58 which cooperates with suitable plastic structure on the upper surface of the circuit board member 32. This provides for nonrotatable retention of the mounting bolts 54 within the composite assembly. The shank portion of each mounting bolt 54 is provided with a knurled portion 60 intermediate the ends of the shank portion and spaced to be at a distance from the head portion 56 which approximates the thickness of the composite assembly of the circuit board member 32 and the terminal plate members 12, 14. Knurled portion 60 cooperates with head portion 56 so that each mounting bolt 54 assists the rivet means 50 in maintaining the composite in assembled relationship.

A further pair of mounting bolts 62, 64 are passed through a pair of apertures provided therefor on extending tab portions 66, 68 of the terminal plate members 12, 14. Additionally, an arc suppressing ridge 70 is provided on the under surface of circuit board member 32 to extend between the confronting ends of the terminal plate members 12, 14, when assembled.

According to the present invention, alternator rectifier 10 is assembled, on automated equipment, by placing a pair of generally flat, complementary heat sinking DC terminal plate members 12, 14 in a suitable fixture. The terminal plate members are arranged to be in the spaced-apart relation of the final assembly. The necessary plurality of diode members 24 are then deposited, one within each of the diode receiving cavities 16. The diode members 24 are oriented so that all diode electrodes in contact with terminal plate member 12 will be of one polarity and the electrodes of the diode members 24 in contact with the terminal plate member 14 will be of a common, and opposite, polarity. A generally planar, U-shaped circuit board member 32 will thereafter be overlaid in contact with the terminal plate members 12, 14 so that each of the conductor member ends 36 will be in contact with an electrode of its associated diode member 24. A plurality of rivet members 50 will thereafter be inserted through the passages which has previously been provided in the circuit board member 32 and the companion passages in each of the terminal plate members 12, 14. Once in place, the rivet members 50 will be suitably deformed so that the terminal plate members 12, 14 will be riveted in close physical contact with the circuit board member 32 to form a unitary composite body. At this juncture, the diode members 24 having exposed spaced-apart electrodes 28, 30 will be retained within diode cavities 16 by the resilient compressive action of the conductive strip member ends in contact with one of the electrodes 28, 30. A plurality of terminal members 46, each having a ring or annulus of preformed solder material 48 will then be positioned in contact with the exposed electrical terminal contact portions of the conductor members, intermediate the ends thereof, through the apertures 44. The fixture may be thereafter passed through a soldering oven maintained at a sufficiently high temperature to cause the solder preform 48 to flow to provide for a mechanically and electrically strong bond between each of the terminal members 46 and its associated conductor strip member. Since a strong electrical and mechanically bond is desired between the electrodes 28, 30 of each of the diode members 24 and the associated terminal plate members 12, 14 and conductor strip member ends 36, 38, 40, each of these surfaces can be provided with a thin film of solder material prior to the assembly operation and the same pass through the soldering oven which has accomplished the flowing of the solder preforms 48 will also accomplish a mechanical and electrical bond between the terminal plate members 12, 14, the electrodes of the diode member 24 in contact therewith, the conductor strip member ends 36, 38, 40 and the diode electrodes of the diode members 24 in contact therewith. Thereafter, the mounting screws 54 may be inserted through the apertures provided therefor in the alternator rectifier 10 and further mounting bolts 62, 64 may be passed through the holes provided therefor in the extending tabs of terminal plate members 12, 14. Where desired, suitable moisture sealant such as a flexible resin material may be applied over all solder joints to assist those joints in resisting any corrosion which might be induced by atmospheric moisture and the like.

In the illustrated embodiment, circuit board member 32 is provided with a further void or aperture at 72 which exposes a portion of one of the conductive strip members. Thus, the left hand (relative to the figure) mounting bolt 54 will be at the electrical potential of the conductive strip member. Insulator 74 is therefore provided to electrically insulate the associated mounting bolt 54 and the terminal plate member 12. This permits an information signal to be derived from the left hand mounting bolt 54 without otherwise disrupting or altering the rectifier construction or performance.

While the present invention has been described with reference to the preferred embodiment, it will be appreciated that various changes may be made without departing from the present invention. For example, the soldering could be accomplished through a single exposure of each of the solder connections to individual heat sources in place of the described pass through a soldering oven. It will also be appreciated that paste solder could be applied to all solder surfaces prior to, or during, the assembly operation. Additionally, the terminals 44 could be fabricated as portions of each of the conductive strip members prior to the formation of the circuit board member 32 and the injection molding of the board would expose a portion of the terminals for connection to the electrical phases of the alternator.

It will thus be seen that the present invention readily accomplishes its stated objectives. An alternator rectifier assembly is provided which may be manufactured by automated assembly techniques and which requires only a single exposure to elevated temperatures. The rivet members 50, in cooperation with the mounting bolts 54, will maintain the circuit board member 32 and the terminal plate members 12, 14 in assembled relation. The use of a circuit board member formed of an injection moldable plastic material in conjunction with the riveting of the terminal plate members 12, 14 in close physical contact with the circuit board member 32 provides a strong, rugged and durable alternator rectifier assembly which is nevertheless low in cost. The alternator rectifier is also easily packaged for shipment, and within the housing of an alternator, since the thickness of the device is reduced to merely the combined thickness of the components and does not require any allowance for extending electrical leads.

I claim:

1. A poly-phase alternator rectifier bridge assembly arranged to be mounted on the end of an alternator comprising in combination:

a generally U-shaped plastic circuit member having a plurality of conductor members embedded therein and mutually electrically insulated thereby and including a first plurality of apertures in the plastic for exposing each end of each conductor member and a second plurality of apertures extending through the plastic without exposing any of the conductor members;

a plurality of first terminal members projecting from the plastic, each first terminal member arranged to be in electrical communication with one of the conductor members;

first and second plate members having a plurality of diode receiving recesses formed in registry with the first plurality of circuit member apertures, arranged to be substantially coplanar, said plate members including a plurality of apertures in registry with said circuit member second apertures;

a plurality of diode members having spatially separated anode and cathode electrodes received within the diode recesses, said diodes oriented to have the cathode electrode of each diode within the recesses in the first plate in contact with the first plate and the anode electrode of each diode with the recesses in the second plate in contact with the second plate; and a plurality of rivet members extending through at least some of the second plurality of circuit member apertures and the first and second plate member apertures in registry therewith, operative to fixedly mount said first and second plate members to said circuit member.

2. The rectifier bridge assembly of claim 1 wherein said circuit member includes an arc preventing ridge projecting away from the member in a direction opposite the first terminal members and arranged intermediate the first and second plate members.

3. The rectifier bridge assembly as claimed in claim 1 wherein the circuit member includes a third aperture extending therethrough without exposing any of the conductor members and a fourth aperture extending therethrough exposing a selected one of the conductor members, said third and fourth apertures being substantially equidistantly spaced from each other and from the ends of the circuit member, and the first and second plate members include corresponding apertures in registry with said third and fourth apertures, the circuit board member including a projecting collar surrounding said fourth aperture for receipt by the plate member corresponding aperture while insulating from the plate member.

4. The bridge assembly of claim 3 including further a pair of mounting bolts received within said third and fourth apertures, said mounting bolts including head portions in contact with said circuit member;

shank portions extending through said circuit member and the associated plate member;

knurled gripping portions spaced apart from said head portions by said shank portions, said knurled portions operative to maintain said circuit member and the associated plate members in tightly assembled relation, cooperative with said rivet members; and threaded portions extending away from said knurled portions.

5. The bridge assembly of claim 4 including insulator means interposed between the knurled portion and the shank portion of the mounting bolt received with the circuit board fourth aperture for insulating the mounting bolt in contact with the selected exposed conductor member from the associated plate member.

6. The method of forming a rectifier bridge assembly, mountable within an alternator in generally surrounding relation to the axis of the alternator rotor, comprising the steps of:

placing a pair of generally flat, complementary plate members on a fixture in final assembly spaced-apart relation;

depositing a plurality of diode elements having exposed, spaced-apart anode and cathode electrodes in the recesses of the plate members, said diodes being oriented to place one of the anode and cathode electrodes of each diode in contact with the associated plate member, the diodes in the recesses of one of the plate members being oriented to place a selected, commonly designated electrode in contact with one plate member while the diodes in the recesses of the other plate member have their oppositely designated electrode in contact therewith;

placing a generally planar, U-shaped circuit board in overlaying contactive engagement with the plate members, said circuit board member having a plurality of mutually insulated conductor strip members which exposed electrical contact portions including the ends thereof, being oriented to place at least some but less than all of the exposed electrical contact portions in electrical communication with the other of the anode and cathode electrodes of the diode members whereby a full wave rectifier circuit may be established;

riveting said circuit board member to said plate members to form a unitary composite body;

inserting a plurality of terminal members having solder preform means within apertures provided therefor in said circuit board member, each of said terminal member contacting a different one of the conductor members; and heating said unitary composite to flow the solder.

7. The method of claim 6 including the step of inserting at least two mounting bolts through aligned apertures provided therefor in the circuit board member and in the complementary plate members.

8. The method of claim 6 wherein the step of heating comprises the steps of passing said unitary composite through a heating environment having a temperature and length of exposure relationship sufficiently great to flow the solder and sufficiently low to avoid heat-induced damage of the diode elements.

9. The method of claim 6 wherein the step of forming a circuit board member comprises the steps of:

arranging a plurality of strip conductor members in a predetermined mutually noncontactive relationship;

providing each end of each strip conductor with an upstanding generally U-shaped bend; and molding plastic material thereabout to form the generally U-shaped circuit board member.

10. The method of claim 9 wherein the step of molding includes the step of providing at least two through apertures in the circuit board member.

11. The method of claim 10 including the step of inserting at least two mounting bolts through apertures provided therefor in the circuit board member and in the complementary plate members.

12. The method of claim 11 wherein the step of heating comprises the steps of passing said unitary composite once through a heating environment having a time, temperature relationship sufficiently high to flow the solder and sufficiently low to avoid heat induced damage of the diode elements.

* * * * *